US010586343B1

(12) United States Patent
Whelan et al.

(10) Patent No.: US 10,586,343 B1
(45) Date of Patent: Mar. 10, 2020

(54) 3-D HEAD MOUNTED DISPLAY BASED ENVIRONMENTAL MODELING SYSTEM

(71) Applicant: Facebook Technologies, LLC, Menlo Park, CA (US)

(72) Inventors: Thomas John Whelan, Redmond, WA (US); Steven John Lovegrove, Woodinville, WA (US); Zhaoming Zhu, Redmond, WA (US); Richard Andrew Newcombe, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 43 days.

(21) Appl. No.: 16/054,598

(22) Filed: Aug. 3, 2018

Related U.S. Application Data

(60) Provisional application No. 62/679,765, filed on Jun. 1, 2018.

(51) Int. Cl.

| | |
|---|---|
| ***G06T 7/521*** | (2017.01) |
| ***G06T 11/00*** | (2006.01) |
| ***G06T 17/00*** | (2006.01) |
| ***G06T 19/00*** | (2011.01) |
| ***G02B 27/01*** | (2006.01) |
| ***G06T 7/90*** | (2017.01) |

(52) U.S. Cl.
CPC .......... *G06T 7/521* (2017.01); *G02B 27/0172* (2013.01); *G06T 7/90* (2017.01); *G06T 11/001* (2013.01); *G06T 17/00* (2013.01); *G06T 19/006* (2013.01)

(58) Field of Classification Search
CPC ......... G06T 7/90; G06T 11/001; G06T 17/00; G06T 19/006; G02B 27/0172
See application file for complete search history.

(56) References Cited

U.S. PATENT DOCUMENTS

2012/0113117 A1* 5/2012 Nakayama ................ G06T 7/50 345/420
2016/0253809 A1* 9/2016 Cole .................... H04N 13/204 345/672
2019/0098276 A1* 3/2019 Duggan ............... H04N 13/271

* cited by examiner

*Primary Examiner* — Edward Park
(74) *Attorney, Agent, or Firm* — Fenwick & West LLP

(57) ABSTRACT

A head mounted display (HMD) dynamically generates a model of an area. The HMD includes a depth camera assembly (DCA), a color camera, and a processing circuitry. The processing circuitry receives, from the DCA, a frame of depth image data, generates a depth map of a portion of the area based on the frame of the depth image data, receives a frame of color image data from the camera, determines a location in a model of the area that corresponds with the portion of the area of the depth map based on the frame of the color image data, and update the model of the area by combining the depth map of the portion of area with one or more other depth maps of one or more other portions of the area based on the location in the model.

20 Claims, 10 Drawing Sheets

400

3-D HEAD MOUNTED DISPLAY BASED ENVIRONMENTAL MODELING SYSTEM

CROSS-REFERENCE TO RELATED APPLICATIONS

This application claims the benefit of U.S. Provisional Patent Application No. 62/679,765, filed Jun. 1, 2018, which is incorporated by reference in its entirety.

BACKGROUND

The present disclosure generally relates to artificial reality systems, and more specifically relates to generating three dimensional models of a local area using a depth camera assembly on a head-mounted display (HMD).

Artificial reality systems, such as virtual reality (VR) systems, augmented reality (AR), or mixed reality (MR) systems, may provide rendered views of a local area or an object surrounding a user wearing an HMD. For example, the HMD may provide a rendered view of an object near the user, or overlay a virtual object on an object. To facilitate the rendering, there is a need to generate a model of the local area.

SUMMARY

An HMD included in an artificial reality system includes a depth camera assembly (DCA), a camera, and a circuitry connected to the DCA and PCA. The DCA generates depth image data of an area, and the camera generates color image data of the area. The processing circuitry is configured to: receive, from the DCA, a frame of the depth image data; generate a depth map of a portion of the area based on the frame of the depth image data; receive, from the camera, a frame of the color image data for the portion of the area; determine a location in a model of the area that corresponds with the portion of the area of the depth map based on the frame of the color image data; and update the model of the area by combining the depth map of the portion of area with one or more other depth maps of one or more other portions of the area based on the location in the model.

Some embodiments include a method for generating a model of an area with a HMD. The method includes: receiving, by a processing circuitry and from a depth camera assembly (DCA) of the HMD, a frame of depth image data captured by the DCA; generating, by the processing circuitry, a depth map of a portion of the area based on the frame of the depth image data; receiving, by the processing circuitry and from a camera of the HMD, a frame of color image data for the portion of the area; determining, by the processing circuitry, a location in a model of the area that corresponds with the portion of area of the depth map based on the frame of the color image data; and updating, by the processing circuitry, the model of the area by combining the depth map of the portion of area with one or more other depth maps of one or more other portions of the area based on the location in the model.

Other aspects include components, devices, systems, improvements, methods, processes, applications, computer readable mediums, and other technologies related to any of the above.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Embodiments may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 1:
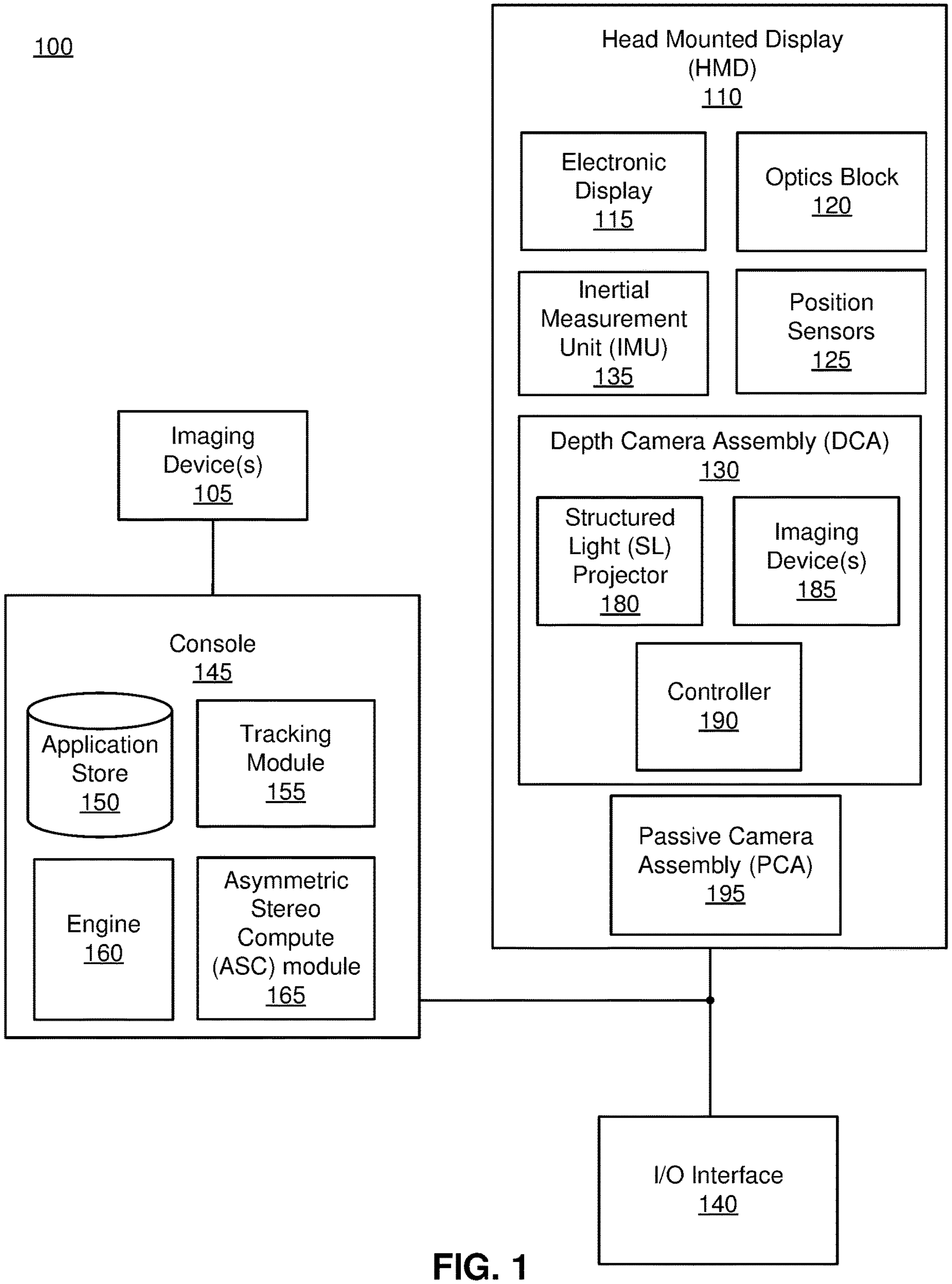
FIG. 1 is a block diagram of a system, in accordance with an embodiment.

FIG. 1 is a block diagram of a system 100, in accordance with an embodiment. The system 100 may operate in a virtual reality (VR), an augmented reality (AR), a mixed reality (MR), or some combination thereof. The system 100 shown by FIG. 1 comprises a HMD 110 and an input/output (I/O) interface 115 that is coupled to a console 145. While FIG. 1 shows an example system 100 including one HMD 110 and one I/O interface 140, in other embodiments any number of these components may be included in the system 100. For example, there may be multiple HMDs 110 each having an associated I/O interface 140, with each HMD 110 and I/O interface 140 communicating with the console 145. In alternative configurations, different and/or additional components may be included in the system 100. Additionally, functionality described in conjunction with one or more of the components shown in FIG. 1 may be distributed among the components in a different manner than described in conjunction with FIG. 1 in some embodiments. For example, some or all of the functionality of the console 145 is provided by the HMD 110.

The HMD 110 is a head-mounted display that presents content to a user comprising augmented views of a physical, real-world local area with computer-generated elements (e.g., two dimensional (2D) or three dimensional (3D) images, 2D or 3D video, sound, etc.) In some embodiments, the presented content includes audio that is presented via an external device (e.g., speakers and/or headphones) that receives audio information from the HMD 110, the console 145, or both, and presents audio data based on the audio information. The HMD 110 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other. In some embodiments, the HMD 110 may also act as a VR headset that presents virtual content to the user that is based in part on a real local area surrounding the user. For example, virtual content may be presented to a user of the HMD. The user physically may be in a room, and virtual walls and a virtual floor of the room are rendered as part of the virtual content.

The HMD 110 includes an electronic display 115, an optics block 120, one or more position sensors 125, a depth camera assembly (DCA) 130, an inertial measurement unit (IMU) 135, and a passive camera assembly (PCA) 195. Some embodiments of the HMD 110 have different components than those described in conjunction with FIG. 1. Additionally, the functionality provided by various components described in conjunction with FIG. 1 may be differently distributed among the components of the HMD 110 in other embodiments, or be captured in separate assemblies remote from the HMD 110.

The electronic display 115 displays 2D or 3D images to the user in accordance with data received from the console 145. In various embodiments, the electronic display 115 comprises a single electronic display or multiple electronic displays (e.g., a display for each eye of a user). Examples of the electronic display 115 include: a liquid crystal display (LCD), an organic light emitting diode (OLED) display, an active-matrix organic light-emitting diode display (AMOLED), some other display, or some combination thereof.

The optics block 120 magnifies image light received from the electronic display 115, corrects optical errors associated with the image light, and presents the corrected image light to a user of the HMD 110. In various embodiments, the optics block 120 includes one or more optical elements. Example optical elements included in the optics block 120 include: an aperture, a Fresnel lens, a convex lens, a concave lens, a filter, a reflecting surface, or any other suitable optical element that affects image light. Moreover, the optics block 120 may include combinations of different optical elements. In some embodiments, one or more of the optical elements in the optics block 120 may have one or more coatings, such as partially reflective or anti-reflective coatings.

Magnification and focusing of the image light by the optics block 120 allows the electronic display 115 to be physically smaller, weigh less, and consume less power than larger displays. Additionally, magnification may increase the field of view of the content presented by the electronic display 115. For example, the field of view of the displayed content is such that the displayed content is presented using almost all (e.g., approximately 110 degrees diagonal), and in some cases all, of the user's field of view. Additionally, in some embodiments, the amount of magnification may be adjusted by adding or removing optical elements.

In some embodiments, the optics block 120 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display 115 for display is pre-distorted, and the optics block 120 corrects the distortion when it receives image light from the electronic display 115 generated based on the content.

The IMU 135 is an electronic device that generates data indicating a position of the HMD 110 based on measurement signals received from one or more of the position sensors 125. A position sensor 125 generates one or more measurement signals in response to motion of the HMD 110. Examples of position sensors 125 include: one or more accelerometers, one or more gyroscopes, one or more magnetometers, another suitable type of sensor that detects motion, a type of sensor used for error correction of the IMU 135, or some combination thereof. The position sensors 125 may be located external to the IMU 135, internal to the IMU 135, or some combination thereof.

Based on the one or more measurement signals from one or more position sensors 125, the IMU 135 generates data indicating an estimated current position of the HMD 110 relative to an initial position of the HMD 110. For example, the position sensors 125 include multiple accelerometers to measure translational motion (forward/back, up/down, left/right) and multiple gyroscopes to measure rotational motion (e.g., pitch, yaw, and roll). In some embodiments, the IMU 135 rapidly samples the measurement signals and calculates the estimated current position of the HMD 110 from the sampled data. For example, the IMU 135 integrates the measurement signals received from the accelerometers over time to estimate a velocity vector and integrates the velocity vector over time to determine an estimated current position of a reference point on the HMD 110. Alternatively, the IMU 135 provides the sampled measurement signals to the console 145, which interprets the data to reduce error. The reference point is a point that may be used to describe the position of the HMD 110. The reference point may generally be defined as a point in space or a position related to an orientation and a position of the HMD 110.

The IMU 135 receives one or more parameters from the console 145. As further discussed below, the one or more parameters are used to maintain tracking of the HMD 110. Based on a received parameter, the IMU 135 may adjust one or more IMU parameters (e.g., sample rate). In some embodiments, certain parameters cause the IMU 135 to update an initial position of the reference point so it corresponds to a next position of the reference point. Updating the initial position of the reference point as the next calibrated position of the reference point helps reduce accumulated error associated with the current position estimated the IMU 135. The accumulated error, also referred to as drift error, causes the estimated position of the reference point to "drift"

away from the actual position of the reference point over time. In some embodiments of the HMD 110, the IMU 135 may be a dedicated hardware component. In other embodiments, the IMU 135 may be a software component implemented in one or more processors.

The DCA 130 generates depth image data of the local area. Depth image data includes pixel values defining distance from the imaging device, and thus provides a (e.g., 3D) mapping of a locations captured in the depth image data. The DCA 130 includes a structured light (SL) projector 180, one or more imaging devices 185, and a controller 190. The SL projector 180 projects a structured light pattern that is reflected off objects in the local area, and captured by the imaging device 185 to generate the depth image data.

For example, the SL projector 180 projects a plurality of structured light (SL) elements of different types (e.g. lines, grids, or dots) onto a portion of a local area surrounding the HMD (e.g., a local area). In various embodiments, the SL projector 180 comprises an emitter and a pattern plate. Here the pattern plate is a diffractive optical element (DOE) associated with a specific pattern. In one or more embodiment a pattern in a pattern plate is defined by the specific arrangement, size, and shape of holes on the pattern plate. As noted herein, a pattern space is a rectilinear space associated with the pattern space. The emitter is configured to illuminate the pattern plate with light (e.g., infrared light). In various embodiments the illuminated pattern plate projects a SL pattern comprising a plurality of SL elements into the local area. For example, each of the SL elements projected by the illuminated pattern plate is a dot associated with a particular location on the pattern plate. That is, in an example embodiment, the SL projector 180 illuminates a local area with a pattern of dots associated with the pattern plate. The SL projector 180 including the emitter, and the pattern plate are further described below in conjunction with FIG. 3.

Each SL element projected by the DCA 130 comprises light in the infrared light part of the electromagnetic spectrum. In some embodiments, the illumination source is a laser configured to illuminate a pattern plate with infrared light such that it is invisible to a human. In some embodiments, the illumination source may be pulsed. In some embodiments, the illumination source may be visible and pulsed such that the light not visible to the eye.

The SL pattern projected into the local area by the DCA 130 deforms as it encounters various surfaces and objects in the local area. The one or more imaging devices 185 are each configured to capture one or more images of the local area. Each of the one or more images captured may include a plurality of SL elements (e.g., dots) projected by the SL projector 180 and reflected by the objects in the local area. Each of the one or more imaging devices 185 may be a detector array, a camera, or a video camera.

In various embodiments, one of the one or more imaging devices 185 is configured to capture images of the local area in the infrared spectrum, or some other spectrum of light emitted by the SL projector 180.

The controller 190 generates the depth image data based on light captured by the imaging device 185. The controller 190 may further provide the depth image data to the ASC module 165 or some other component.

The passive camera assembly (PCA) 195 includes one or more passive cameras that generate color (e.g., RGB) image data. Unlike the DCA 130 that uses active light emission and reflection, the PCA 195 captures light from the environment of a local area to generate image data. Rather than pixel values defining depth or distance from the imaging device, the pixel values of the image data may define the visible color of objects captured in the imaging data. In some embodiments, the PCA 195 includes a controller that generates the image data based on light captured by the passive imaging device.

In some embodiments, the DCA 130 and the PCA 195 share a controller. For example, the controller 190 may map each of the one or more images captured in the visible spectrum (e.g., image data) and in the infrared spectrum (e.g., depth image data) to each other. In one or more embodiments, the controller 190 is configured to, additionally or alternatively, provide the one or more images of the local area to the console 145.

The I/O interface 140 is a device that allows a user to send action requests and receive responses from the console 145. An action request is a request to perform a particular action. For example, an action request may be an instruction to start or end capture of image or video data, or an instruction to perform a particular action within an application. The I/O interface 140 may include one or more input devices. Example input devices include: a keyboard, a mouse, a game controller, or any other suitable device for receiving action requests and communicating the action requests to the console 145. An action request received by the I/O interface 140 is communicated to the console 145, which performs an action corresponding to the action request. In some embodiments, the I/O interface 140 includes an IMU 135, as further described above, that captures calibration data indicating an estimated position of the I/O interface 140 relative to an initial position of the I/O interface 140. In some embodiments, the I/O interface 140 may provide haptic feedback to the user in accordance with instructions received from the console 145. For example, haptic feedback is provided when an action request is received, or the console 145 communicates instructions to the I/O interface 140 causing the I/O interface 140 to generate haptic feedback when the console 145 performs an action.

The console 145 provides content to the HMD 110 for processing in accordance with information received from one or more of: the DCA 130, the PCA 195, the HMD 110, and the I/O interface 140. In the example shown in FIG. 1, the console 145 includes an application store 150, a tracking module 155, an engine 160, and an ASC module 165. Some embodiments of the console 145 have different modules or components than those described in conjunction with FIG. 1. Similarly, the functions further described below may be distributed among components of the console 145 in a different manner than described in conjunction with FIG. 1. In some embodiments, the functionality discussed herein with respect to the console 145 may be implemented in the HMD 110.

The application store 150 stores one or more applications for execution by the console 145. An application is a group of instructions, that when executed by a processor, generates content for presentation to the user. Content generated by an application may be in response to inputs received from the user via movement of the HMD 110 or the I/O interface 140. Examples of applications include: gaming applications, conferencing applications, video playback applications, or other suitable applications.

The tracking module 155 calibrates the local area of the system 100 using one or more calibration parameters and may adjust one or more calibration parameters to reduce error in determination of the position of the HMD 110 or of the I/O interface 140. For example, the tracking module 155 communicates a calibration parameter to the DCA 130 to adjust the focus of the DCA 130 to more accurately determine positions of SL elements captured by the DCA 130. Calibration performed by the tracking module 155 also accounts for information received from the IMU 135 in the HMD 110 and/or an IMU 135 included in the I/O interface 140. Additionally, if tracking of the HMD 110 is lost (e.g., the DCA 130 loses line of sight of at least a threshold number of the projected SL elements), the tracking module 1550 may re-calibrate some or all of the system 100.

The tracking module 155 tracks movements of the HMD 110 or of the I/O interface 140 using information from the DCA 130, the one or more position sensors 125, the IMU 135 or some combination thereof. For example, the tracking module 155 determines a position of a reference point of the HMD 110 in a mapping of a local area based on information from the HMD 110. The tracking module 155 may also determine positions of the reference point of the HMD 110 or a reference point of the I/O interface 140 using data indicating a position of the HMD 110 from the IMU 135 or using data indicating a position of the I/O interface 140 from an IMU 135 included in the I/O interface 140, respectively. Additionally, in some embodiments, the tracking module 155 may use portions of data indicating a position or the HMD 110 from the IMU 135 as well as representations of the local area from the DCA 130 to predict a future location of the HMD 110. The tracking module 155 provides the estimated or predicted future position of the HMD 110 or the I/O interface 140 to the engine 160, and the asymmetric stereo compute (ASC) module 165.

The engine 160 generates a 3D mapping of the area surrounding the HMD 110 (i.e., the local area) based on information received from the HMD 110. In some embodiments, the engine 160 determines depth information for the 3D mapping of the local area based on information received from the DCA 130 that is relevant for techniques used in computing depth. The engine 160 may calculate depth information using one or more techniques to compute depth based on SL. A technique used depth based on SL may include, e.g., using triangulation and/or perceived deformation of a SL pattern that is projected onto a surface to determine depth and surface information of objects within the scene. In various embodiments, the engine 160 uses different types of information determined by the DCA 130 or a combination of types of information determined by the DCA 130.

The engine 160 also executes applications within the VR system local 100 and receives position information, acceleration information, velocity information, predicted future positions, or some combination thereof, of the HMD 110 from the tracking module 155. Based on the received information, the engine 160 determines content to provide to the HMD 110 for presentation to the user. For example, if the received information indicates that the user has looked to the left, the engine 160 generates content for the HMD 110 that mirrors the user's movement in a virtual local area or in a local area augmenting the local area with additional content. Additionally, the engine 160 performs an action within an application executing on the console 145 in response to an action request received from the I/O interface 140 and provides feedback to the user that the action was performed. The provided feedback may be visual or audible feedback via the HMD 110 or haptic feedback via the I/O interface 140.

The ASC module 165 generates a model of an area (or "local area") based on color image data generated by the PCA 195 and depth image data generated by the DCA 130. Color image data refers to image data captured by a passive, color camera, such as the PCA 195. Color image data may include different colors that represent the color of the objects captured in the color image data. Depth image data refers to image data captured by the DCA 130, and may include SL elements reflected from objects. The ASC module 165 generates a depth map using the depth image data. The depth map for a frame of depth image data may include depth values. The ASC module 165 uses the color image data to locate the depth map in a model of the local area, and combine depth maps from multiple depth image data frames into a single depth map for the model of the local area. The model of the local area may also be texturized using, e.g., the color image data from the PCA 195. Some and/or all of the ASC module 165 may be on the HMD 110 or some other device (e.g., a server, console 145, etc.). The HMD 110 may use the model of the local area to render content to a user of the HMD.

In some embodiments, the ASC module 165 uses an exact asymmetric stereo (EAS) algorithm to match each of the plurality of SL elements (e.g., dots) detected in the image space to its corresponding location in pattern space. The EAS algorithm disambiguates the plurality of SL elements projected by the DCA 130 into the local area. For example, in embodiments where each of the plurality of SL elements projected by the DCA 130 corresponds with an aperture or dot of a pattern plate, the ASC module 165 maps each of the plurality of dots in an image of the local area captured by the DCA 130 to a dot or aperture on the pattern plate. The ASC module 165 is further described below in conjunction with FIG. 2. In some embodiments, the ASC module 165 is included in the HMD 110, such as in the DCA 130.

Figure 2:
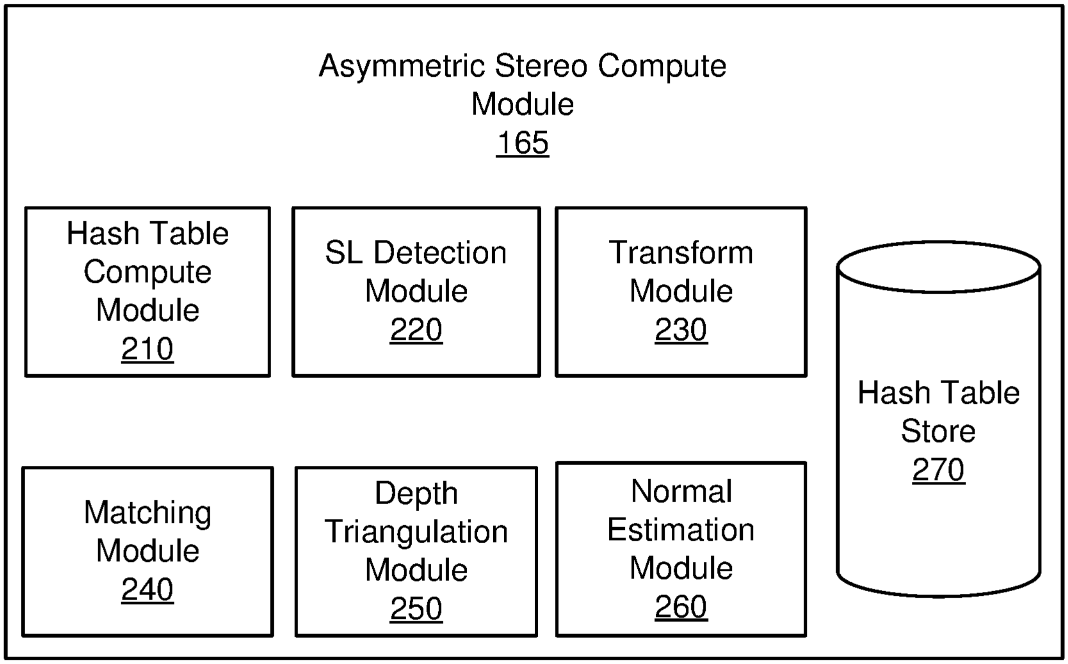
FIG. 2 is a block diagram of an asymmetric stereo compute module of FIG. 1, in accordance with an embodiment.

FIG. 2 is a block diagram of the ASC module 165 of FIG. 1, in accordance with an embodiment. The ASC module 165 matches SL elements captured by the DCA 130 with the apertures on a pattern plate to generate a depth map. The ASC module 165 includes a hash table compute module 210, a SL detection module 220, a transform module 230, a matching module 240, a depth triangulation module 250, a normal estimation module 260, and a hash table store 270. Some embodiments of the ASC module 165 may have different components than those described in conjunction with FIG. 2. Additionally, the functionality provided by various components described in conjunction with FIG. 2 may be differently distributed among the components of the ASC module 165 in other embodiments, or be captured in separate assemblies remote from the ASC module 165.

The hash table compute module 210 generates a hash table for a pattern of a pattern plate. Each aperture of the pattern plate corresponds with a structured light SL element that is projected by the DCA 130. A pattern of the pattern plate may include an arrangement of multiple apertures. In some embodiments, the pattern is defined by a 9×9 pixel grid. Each pixel of the pattern may be defined by a bit, with a 1 value defining an aperture and a 0 value defining a location on the pattern plate without an aperture. As such, a hash table for a 9×9 pixel pattern may be defined by an 81-bit binary code in raster row-major fashion. The 81-bit binary code may be stored in a 128-bit integer used as a key. Other sizes may be used for the pattern and hash table. For example, a 6×6 pixel pattern may be defined by a 36-bit code. The generated hash table is stored in the hash table store 270 and associated with a key. In some embodiments, the hash table associated with a pattern of the pattern plate is stored in the hash table store 270. In some embodiments, the hash table compute module 210 may compute a hash table associated with a particulate pattern of the pattern plate.

The SL detection module 220 receives one or more images (e.g., depth image data) of a local area from the DCA 130. Here, each of the one or more images is a 2D image of a local area and includes the plurality of SL elements projected by the DCA onto the local area. The SL detection module 220 may apply a full frame blur on each of the one or more received images. In an embodiment, the full frame blur is 2D Gaussian blur with a size that corresponds with the size of the pattern (e.g., of 9×9 pixels) of the pattern plate. The SL detection module 220 may sub-divide one or more received images into individual patterns with dimensions of 9×9 pixels and applies a Gaussian blur on each pattern. In various embodiments, the Gaussian blur is applied to remove noise from each of the one or more captured images and to enable dot detection. In other embodiments, the Gaussian blur is applied for patterns that are larger or smaller than that noted here. For example, a Gaussian blur may be performed on a pattern size of 3×3 pixels or, alternatively, a Gaussian blur may be performed on a pattern size of 15×15 pixels. In some embodiments, the size of the pattern to which a frame blur is applied is dependent upon the noise detected in the scene, and the resolution of the received image. Here, the computational cost of the Gaussian blur scales linearly with the number of pixels in each of the one or more received images.

The SL detection module 220 determines the center of each of the plurality of SL elements in each of the one or more captured images. Determining the center of each dot in a particular captured image comprises determining a set of pixels surrounding the dot and performing a threshold parabola fit on the determined set of pixels. In an embodiment, the set of pixels is a 2D array with a size of 3×3 pixels. Here, the center of the dot is the pixel in the set of pixels corresponding to the maximum of the fitted parabola. In an embodiment, the parabola fit is determined based on a local intensity gradient in the array of pixels. For example, the SL detection module 220 determines that the center of a dot is the pixel with the highest intensity in the set of pixels. Generally the size of the 2D array defining the set of pixels is determined based on the resolution of an imaging device associated with the DCA 130.

The SL detection module 220 may also determine a set of neighboring SL elements within a pattern for each of the plurality of SL elements in a received image. In an embodiment, the SL detection module 220 determines a 12×12 pixel window centered on a determined location of a first SL element. Each pixel in the determined window indicates a location of a neighboring dot. That is, the determined 12×12 pixel window indicates the locations, in image space, of one or more other SL elements adjacent to the first SL element within the determined window. Here, locations of neighboring SL elements may be determined by performing a parabola fit as described above. In other embodiments, different window sizes may be used to perform a threshold parabola fit and determine a list of neighbors.

The transform module 230 applies warp functions to a window around each SL element in a frame of depth image data to generate candidate warps. Each of the warp functions apply at least one of a stretch or a skew to the second window. In some embodiments, the transform module 230 generates a reverse transform from the image space to the pattern space for each dot and its neighbors. Here, the reverse transform maps each SL element and its neighbors within a window to a dots on the pattern plate. A reverse transform from image space to pattern space for a given 12×12 pixel window comprises a set of candidate warps. The set of candidate warps may comprise stretches, skews, rotations, and any combination thereof. In an example embodiment, the transform module 230 determines 18 candidate warps for each 12×12 window associated with a SL element. Here, a warp is a plane induced homography for each of the determined 12×12 windows and the number of compute operations associated with determining the reverse transform scales linearly with the number candidate warps. That is, the greater the number of candidate warps comprising a reverse transform, the slower the performance.

The matching module 240 determines binary codes for the warp candidates, and matches SL elements to apertures based on comparing the binary codes of the candidate warps with the hash table of an aperture. In some embodiments, the matching module 240 generates one or more codes for each of the one or more candidate warps generated by the transform module 230. In an embodiment, each of the one or more codes is a binary code. The one or more codes are used as keys to determine an exact match to the identified SL elements and its neighbors via a hash table associated with the DCA. In various embodiments, the hash table associated with the DCA is stored the hash table store 270.

In various embodiments, the matching module 240 may not find an exact match for each of the plurality of SL elements in the captured image. For example, the matching module 240 may determine an exact match for only a first subset of the plurality of SL elements in a captured image. If not all of the observed SL elements in a received image are mapped to an aperture on the pattern plate, the matching module 240 may iteratively augment the number of exact matches determined by the matching module 240 by performing a fringe growth. That is the matching module 240 may iteratively determine a match for a second subset of the plurality of SL elements by exploiting the fact that each exactly matched SL elements also, implicitly, indicates a location of its neighboring SL elements. For example, a matched SL element to an aperture may be used to match another SL element to another aperture based on the known distance or relative locations of the apertures. In some embodiments, additional SL elements may be matched based on the SL element that is matched from fringe growing in an iterative process. As such, the matching module 240 can increase the number of matches based on one or more determined exact matches. Here, each iteration results in a growth in the number of matched SL elements which are then recursive used to determine additional matches.

In some embodiments, matching module 240 may perform false positive filtering. The matching module 240 may reject SL elements matches with apertures based on one or more filtering criteria. For example, if a distance of two SL elements that are matched to two apertures determined from depth image data exceeds a distance threshold for detecting a false positive match, then one or more of the matches may be discarded. In an embodiment, filtering criteria used to filter matches include, for example, SL elements matches that violate distance from an epipolar curve. For example, if a point is matched to a location that is a threshold distance away from an epipolar curve associated a plurality of other points are discarded. Another filtering criteria includes rejecting matched SL elements that are a greater than a maximum epipolar distance from the epipolar curve. For example, a SL elements that is a first distance away from a plurality of points that define an epipolar curve is rejected if the first distance is greater than a maximum distance from the epipolar curve. It should be noted that the process described herein is a per-dot operation and thus scales linearly with the number of matched SL elements.

The depth triangulation module 250 determines a normal vector the SL elements based on a triangulation using a distance between the SL projector and the imaging device. In some embodiments, the depth triangulation module 250 receives the matched SL elements from the matching module 240. In an embodiment, the depth triangulation module 250 geometrically triangulates a depth for each of the one or more matched SL elements matched to apertures by the matching module 240. The depth triangulation module 250 determines a depth based on a calibrated distance between the emitter an imager on the DCA 130 and a depth triangulation method. Here, calibration compensates for geometric distortions caused by optics and a perspective of a pattern projected by the emitter. In an example embodiment, the depth triangulation module 250 triangulates a depth for a matched SL element by determining a first angle between the matched SL element and the emitter and a second angle between the matched SL element and the imaging device. In the previous example embodiment, the first angle, the second angle, a distance between the imager and the emitter, including calibration parameters are used to determine a distance between the DCA 130 and the matched SL element. In an embodiment, the process described in the example above is repeated for each of the one or more matched SL elements. In this way, the depth triangulation module 250 may determine a depth value for each of the matched SL elements offline. Generally the accuracy of the triangulation module 230 may be limited by a precision associated with a precision of a determined SL element center.

The normal estimation module 260 receives depth data associated with each of the matched SL elements from the depth triangulation module 250. Here, the depth data includes the distance between each of the matched points. In an embodiment, the normal estimation module 260 performs a standard neighboring triangle area based method. For example, the normal estimation module 260 may perform a cross product between neighboring matched SL elements to determine a normal vector. In an embodiment, the normal estimation module 260 determines a normal vector for each of the matched SL elements. The normal estimation module 260 may also predict a location and distance from the DCA 130 for one or more undetected SL elements that are surrounded by the matched SL elements. For example, the normal estimation module may determine a topology based on normal vectors of SL elements, and determine other normal vectors for locations that are not illuminated by a SL element based on the topology. In another example, based on the calibration parameters, and the projected pattern of SL elements, the normal estimation module may predict a location, a distance from the DCA 130, and a normal vector for one or more predicted SL elements.

Figure 3:
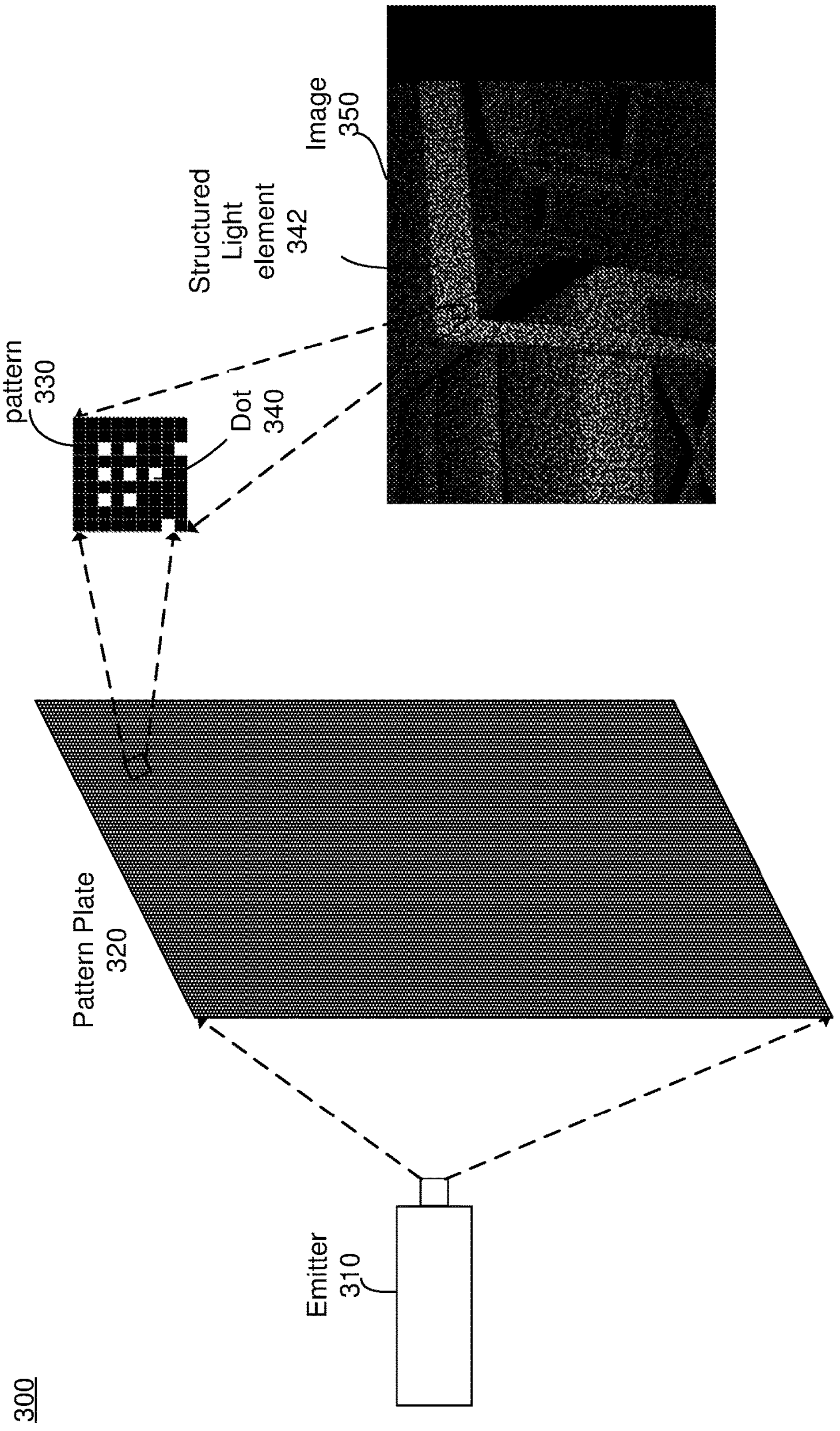
FIG. 3 is an example arrangement of a depth camera assembly projecting a structured light pattern into a local area in accordance with an embodiment.

FIG. 3 is a shows a SL projector 300 of a DCA 130 described above in conjunction with FIG. 1, in accordance with an embodiment. The SL projector 300 includes an emitter 310 and a pattern plate 320. In the embodiment depicted in FIG. 3, the pattern plate 320 can include multiple windows as shown by pattern 330, each window including a center dot and one or more surrounding dots. The pattern 330 includes a specific arrangement of dots, such as dot 340. In the pattern 330 cells in white are associated with a dot 340 while black cells in the pattern 330 indicate a location without a dot 340. In FIG. 3, the emitter 310 is configured to illuminate the pattern plate 320 which projects a plurality of SL elements 342 onto the local area in a pattern defined by the dots 340 of the pattern plate 320. The SL projector 300 is an embodiment of the SL projector associated with the DCA 130 described above in conjunction with FIG. 1.

The emitter 310 maybe one or more edge emitter laser diodes, a row of lasers on the same substrate (e.g. laser bar), or a vertical cavity surface emitting laser (VCSEL), and each emitter may be coupled to the pattern plate 320. In embodiments where the emitter 310 is one or more edge emitter laser diodes, the emitter 310 may include a first emitter coupled to a first pattern plate 320 and a second emitter 310 with a second pattern plate 320 to project a pattern of SL elements (e.g., dots) onto a local area. In embodiments where the emitter 310 is a laser bar, the SL projector 300 includes first emitter 310 and a second emitter 310 on the same substrate, with corresponding first pattern plate 320 and second pattern plate 320 to project different patterns of dots onto the local area. Finally, in embodiments in which the emitter 310 is a VCSEL, the VCSEL may include a first set of lasers and a second set of lasers with corresponding first and second DOEs (e.g., pattern plates) to produce different patterns of SL elements 342. The VCSEL emits light perpendicular to the top surface of the laser instead of the edge as in conventional edge emitter laser diodes and can support an array of lasers on a single substrate. The VCSEL has a potential reduction in size over using conventional edge emitter laser diodes, but typically has lower intensities than conventional edge emitter laser diodes. Each laser in an array of lasers of the VCSEL could have its own DOE to produce SL. The array of lasers of the VCSEL could be modulated individually or as a group to produce SL.

In various embodiments, the SL projector 300 may be configured to display different intensities, bands, or frequency of patterns of SL elements. The SL projector 300 may increase the intensity of a pattern by increasing the power or the number of emitters 310 that are turned on. The one or more emitters 310 of the SL projector 300 may emit the same spectrum of light, or each emitter may emit a different spectrum or particular range of wavelengths of light (i.e., "bands" of light.) Example bands of light emitted by the emitter 310 include: a visible band (~380 nm to 750 nm), an infrared (IR) band (~750 nm to 2,200 nm), an ultraviolet band (100 nm to 380 nm), another portion of the electromagnetic spectrum, or some combination thereof. The SL projector 300 may display one pattern of SL at certain times and a different pattern of SL at other times and may change the frequency at which each pattern is shown.

The pattern plate 320 is configured to shape, split, and project light emitted by the emitter 310 onto a local area. In an embodiment the pattern plate 320 is configured to project a specific pattern of SL elements 342 onto the local area, each corresponding with a dot 340 (or "aperture") of the pattern plate 320. In some embodiments, the pattern plate 320 is a diffractive beam splitter configured to divide an input beam (e.g., a beam from an emitter 310) into N output beams. Here, each output beam generated by the pattern plate 320 retains the same optical characteristics of the input beam (e.g., size, polarization, power, and phase). In one or more embodiments, the pattern plate 320 is configured to project a 1-dimensional (1D) or a 2D pattern of dots into the local area. In the embodiment depicted in conjunction with FIG. 3, the pattern plate 320 includes a plurality of dots 340 arranged in a pattern 330. In the embodiment of FIG. 3, the pattern 330 comprises 9 dots 340 and has dimensions of 9 by 9 pixels. In an embodiment, the divergence of each dot is in milliradians. The pattern 330 may repeat throughout pattern plate 320. In other embodiments, the pattern 330 may comprise additional dots 340, have a different dimension or the dots 340 may be of different sizes.

The image 350 is a 2D image of the local area into which the pattern plate 320 projects. In various embodiments, the image 350 is captured by an imaging device configured to capture light in the infrared part of the electromagnetic spectrum. Here, the imaging device is associated with a DCA (e.g., DCA 130). In image 350, the SL elements 342 are shown as white dots, which are projected onto objects in the image 350. The image 350 includes SL elements 342 corresponding to multiple patterns 330 of the pattern plate 320. Each SL element 342 in the image 350 maps to a particular dot 340 (or aperture) of the pattern plate 320. In various embodiments, the image 350 is captured by an imaging device associated with a DCA and transmitted to a console (e.g., console 145), HMD, or other computing device. Some or all of the SL elements 342 are mapped to an aperture of the pattern plate 320 (e.g., via the ASC module 165). The process of matching an instance of the pattern 330 to a location on the pattern plate 320 is further described below in conjunction with FIG. 4.

Example Model Mapping Processes

Figure 4:
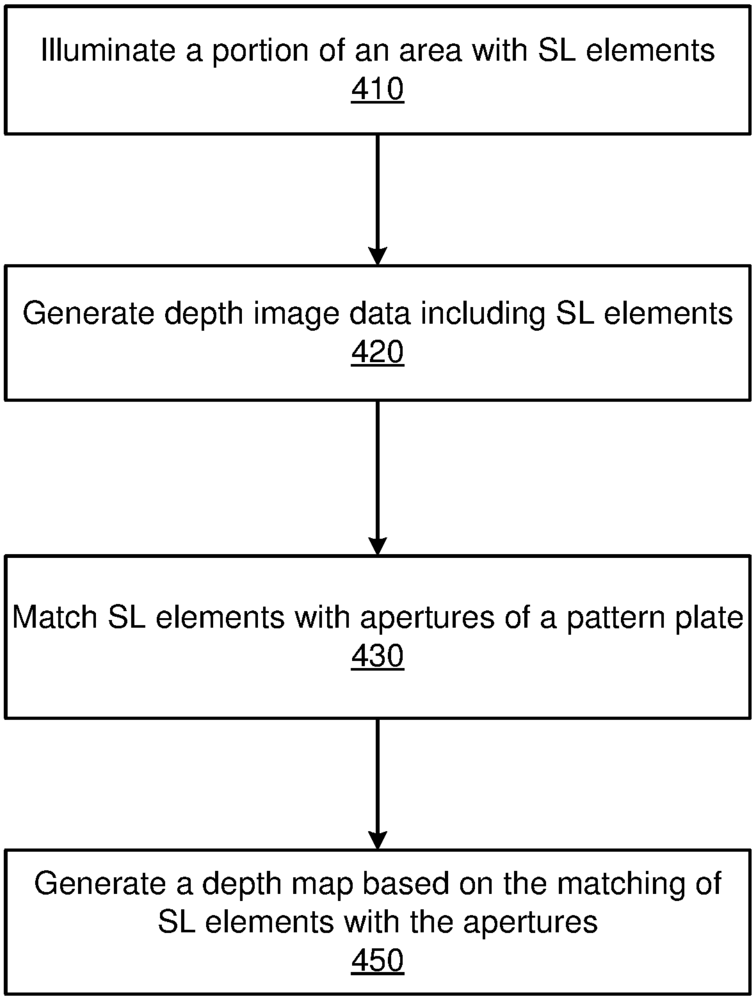
FIG. 4 is a flow chart of a process for generating a depth map for a model of an area, in accordance with an embodiment.

FIG. 4 is a flow chart of a process 400 for generating a depth map for a model of an area, in accordance with an embodiment. The depth map may be generated by performing a match between SL elements projected by the DCA 130 into the area to apertures on a pattern plate (e.g., pattern plate 320), and using distortions between the SL elements captured in images by the DCA 130 and the apertures to determine the topology of objects. The process 400 may include fewer or additional steps, and steps may performed in different orders.

In FIG. 4, a SL projector associated with the DCA 130 illuminates 410 a portion of an area with SL elements. The area may be a local area around the HMD 110 that is scanned to generate a model of the area. The portion of the area may include a region of the area that is being captured by the SL projector. For example, the SL projector projects a SL pattern onto objects at the portion of the area. In an embodiment, the SL pattern is a repeating pattern of SL elements, each of the SL elements corresponding with an aperture of a pattern plate.

The SL projector generates 420 depth image data of the portion of the area including the SL elements. The DCA 130 captures one or more frames (or images) of the local area as depth image data. Capturing images of the local area are further described above in conjunction with FIGS. 1 and 3.

A processing circuitry (e.g., ASC module 165 of the console 145, or HMD 110) matches 430 the SL elements with apertures of a pattern plate. For example, the processing circuitry receives one or more images of the local area captured by the DCA 130. Each image may include a frame of the depth image data captured by the DCA 130. Here each of the one or more images includes images of a plurality of SL elements projected into the local area by the DCA 130. In an embodiment, the processing circuitry identifies one or more SL elements in each of the received one or more images. The processing circuitry determines a location of each SL element of each of the plurality of SL elements in each of the one or more received images. The processing circuitry maps each of the plurality of SL elements in the one or more received images to an aperture or location on a pattern plate (e.g., pattern plate 320) associated with the DCA 130. Here, the mapping may be performed via the ASC module 165 which is described above in conjunction with FIGS. 1 and 2.

In some embodiments, at least a portion of the SL elements in a frame of depth image data are matched with at least a portion of the apertures of a pattern plate. For example, the processing circuitry generates a hash table for a pattern of the pattern plate. The pattern plate may include the same pattern that is repeated multiple times on the pattern plate, or there may be multiple different patterns. The processing circuitry identifies a SL element in a frame of the depth image data, and applies warp functions to a window around the SL element in the frame of the depth image data to generate candidate warps. The pattern may include multiple apertures and the window may include multiple SL elements. Each of the warp functions apply at least one of a stretch or a skew to the window. The processing circuitry determines binary codes for each of the candidate warps, and uses the binary codes to match the SL element an aperture of the pattern based on comparing the binary codes of the candidate warps with the hash table of the pattern.

In some embodiments, matching SL elements to apertures includes performing a false positive filtering. For example, a distance threshold between two SL elements may be defined for detecting a false positive match. If a first and second SL element are matched with corresponding apertures but separated in the window or frame of depth image data by a distance that exceeds the threshold, then at least one of the matches may be discarded.

In some embodiments, matching SL elements to apertures includes performing a fringe growing. For example, after a first SL element is matched with an aperture of a pattern, a second SL element may be matched with a second aperture based on relative positions of the first and second apertures on the pattern plate. The fringe growing may be performed when a SL element fails to be matched with an aperture, and there may be iterations where a match determined by fringe growing is used as a basis for an additional match.

The processing circuitry generates 450 a depth map for the portion of the area based on the match of the SL elements with the apertures. For example, the processing circuitry determines a depth of each of the one or more mapped SL points. In various embodiments, the processing circuitry determines the depth by performing a geometric depth triangulation. For example, the depth map may include normal vectors for SL elements as determined based on a triangulation using a distance between the SL projector that projects the SL elements and the imaging device that generates the depth image data including the SL elements. In an embodiment, the depth triangulation is performed by the ASC module 165 which is further described above in conjunction with FIG. 3.

In some embodiments, the processing circuitry also performs a normal estimation and fill-in to complete the depth map for locations around the SL elements. For example, the processing circuitry may determine a topology based on normal vectors of the plurality of SL elements, and determine a normal vector for a location in the frame of the depth image data that is unilluminated by the plurality of SL elements based on the topology.

Figure 5:
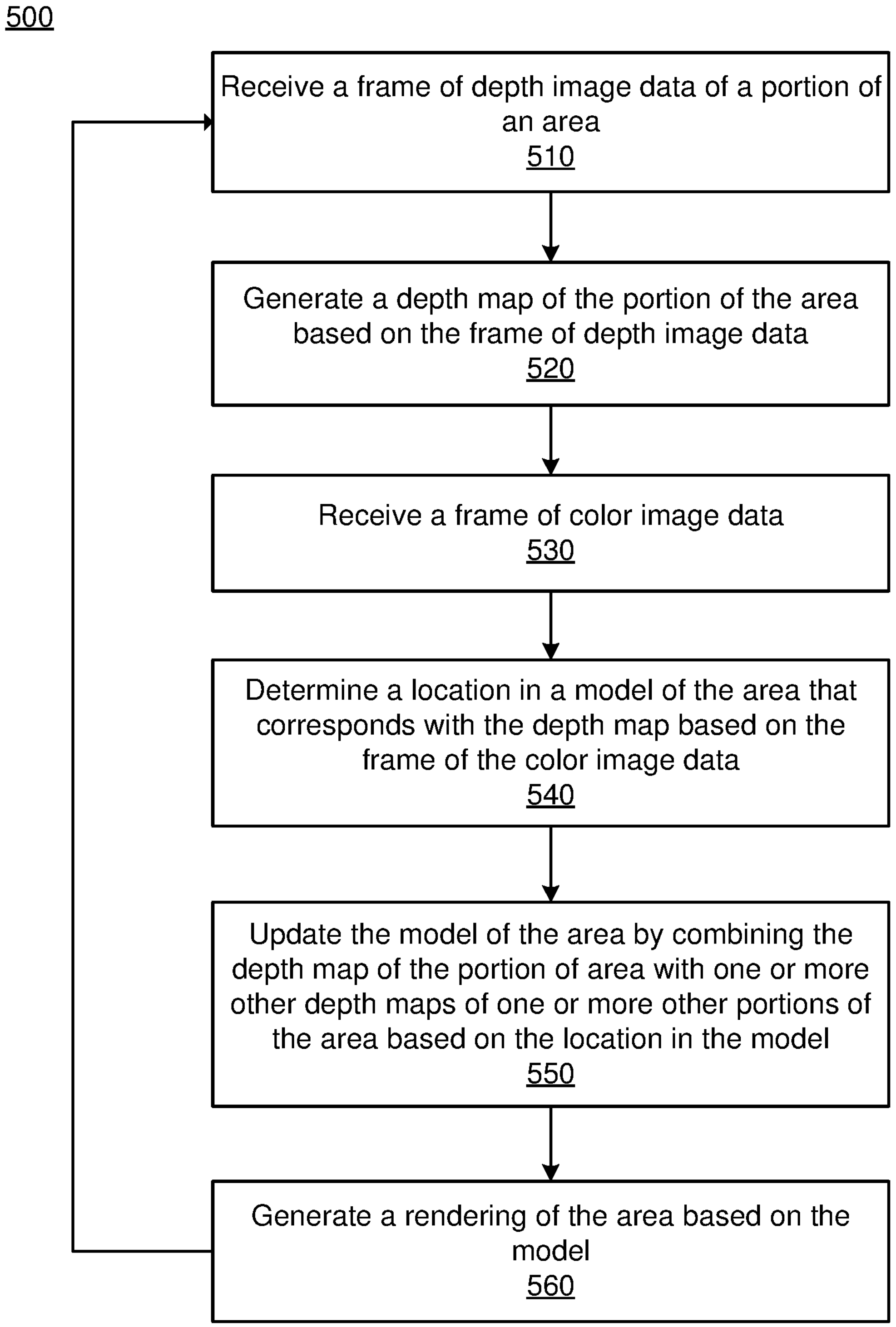
FIG. 5 is a flow chart of a process for generating a model of an area, in accordance with an embodiment.

FIG. 5 is an illustrative process flow 500 for generating a model of an area, in accordance with an embodiment. The process 500 may include fewer or additional steps, and steps may performed in different orders.

A processing circuitry (e.g., ASC module 165, engine 160, or some other processor) receives 510 a frame of depth image data for a portion of an area. For example, a DCA 130 generates the frame of depth image data of the portion of the area, and provides the depth image data to the processing circuitry. The DCA 130 may be located on the HMD 110 worn on a user's head. Here, the frame of the depth image data captures a location in the area, such as a location that corresponds with where the user of the HMD 110 is facing. The DCA 130 may provide the frame of depth image data to the ASC module 165.

The processing circuitry generates 520 a depth map of the portion of the area based on the frame of depth image data. For example, the processing circuitry may determine a depth value for each SL element captured in the frame of depth image data. The discussion of the process 400 shown in FIG. 4 may be applicable at 520.

The processing circuitry receives 530 a frame of color image data from a camera. For example, the PCA 195 generates passive image data of the portion of the area. The passive image data may include color image data. In some embodiments the image data comprises monochrome image data of the local area (e.g., gray scale). The passive image data may include one or more frames of passive image data of the portion of the area corresponding with the frame of the depth image data. The PCA 195 may be located on the HMD 110, or may be located elsewhere in the local area. The PCA 195 provides the color image data to the processing circuitry.

The processing circuitry updates 540 determines a location in a model of the area that corresponds with the depth map based on the frame of the color image data. The model of the area may include depth values of the depth map. The depth map, corresponding with a portion of the area, may be fitted to a location in the model based on the color image data. In some embodiments, the color image data of a given frame is tracked against the existing map of the area using simultaneous localization and mapping (SLAM). By incrementally estimating the area map at the same time as tracking the location of HMD 110 against the area map, the processing circuitry can determine the location of the depth map and the location of the color image. In some embodiments, a particle filter, extended Kalman filter, or GraphSLAM algorithm may be used to perform the SLAM.

The processing circuitry updates 550 the model of the local area by combining the depth map of the portion of the area with one or more other depth maps of one or more other portions of the area based on the location in the model. For example, the DCA 130 may continue to generate depth image data and the PCA 195 may continue to generate color image data for the different portions of the area to build the full model of the area. For each depth map representing a different portion of the area, the location where the depth map fits into the model is determined based on the color image data. Among other things, the model can be generated and updated as a user moves within the area, with the DCA 130 and PCA 195 continuing to capture image data. In some embodiments, previously generated depth maps may be refined and updated from additional frames of image to improve the accuracy of the modeling.

The processing circuitry generates 560 a rendering of the area based on the model. The rendering may include a portion of the local area, such as objects in the area corresponding to locations of the user's gaze. In some embodiments, depth image data from the DCA or color image data from the PCA 195 may be used to determine the location in the area that should be rendered. As such, at least a portion of the depth values of the model may be used to generate the rendering. Furthermore, the model of the local area may be texturized in the rendering using the color image data generated by the PCA 195.

The process 500 may be repeated to generate a rendering of different portions of the local area. For example, the ASC module 165 may fuse subsequent continuous depth maps from subsequent frames of depth image data into a single depth map for the model of the area. Additional frames of image data and depth image data may be incorporated into the model to improve the model over time, and to facilitate the generation of the rendering of the area. In the embodiment, once the processing circuitry generates the rendering of the portion of the area, the process 500 may be repeated for another portion of the local area.

In an embodiment, the processing circuitry may repeat the process 500 for each of one or more portions of the local area. New locations may be added to the model as needed to provide an artificial reality environment. The movement of the user through the environment can define the bounds and size of the model.

Figure 6:
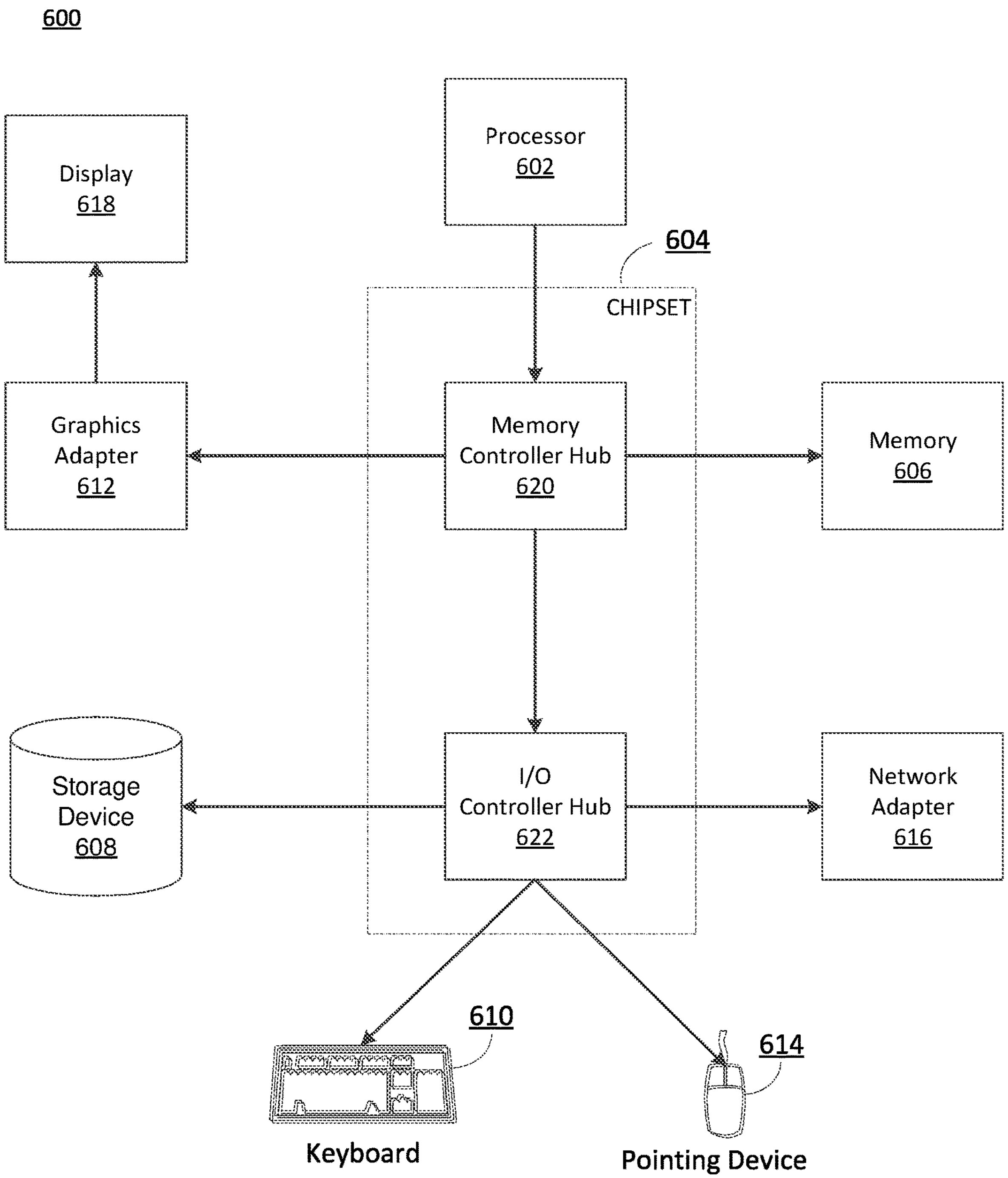
FIG. 6 is a high-level block diagram illustrating physical components of a computer, in accordance with an embodiment.

FIG. 6 is a high-level block diagram illustrating physical components of a computer system 600. The computer system 600 can be used as part or all of the systems described, for example, the console 145, the HMD 110, and/or the I/O interface 140 described above in conjunction with FIG. 1. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display (e.g., electronic display 115) is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is any non-transitory computer-readable storage medium, such as a hard drive, compact disk read-only memory (CD-ROM), DVD, or a solid-state memory device. The memory 606 holds software (comprised of instructions) and data used by the processor 602. The pointing device 614 may be a mouse, track ball, a gaze based interface, or other type of pointing device, and is used in combination with the keyboard 610 to input data into the computer system 600. The graphics adapter 612 displays images and other information on the display 618. The network adapter 616 couples the computer system 600 to a local or wide area network.

As is known in the art, a computer system 600 can have different and/or other components than those shown in FIG. 6. In addition, the computer system 600 can lack certain illustrated components. In one embodiment, a computer system 600 acting as a server may lack a keyboard 610, pointing device 614, graphics adapter 612, and/or display 618. Moreover, the storage device 608 can be local and/or remote from the computer system 600 (such as embodied within a storage area network (SAN)).

As is known in the art, the computer system 600 is adapted to execute computer program modules for providing functionality described herein. As used herein, the term "module" refers to computer program logic utilized to provide the specified functionality. Thus, a module can be implemented in hardware, firmware, and/or software. Firmware and/or software can be embodied as program code (or instructions). In one embodiment, program modules are stored on the storage device 608, loaded into the memory 606, and executed by the processor.

Example Head Mounted Display

Figure 7:
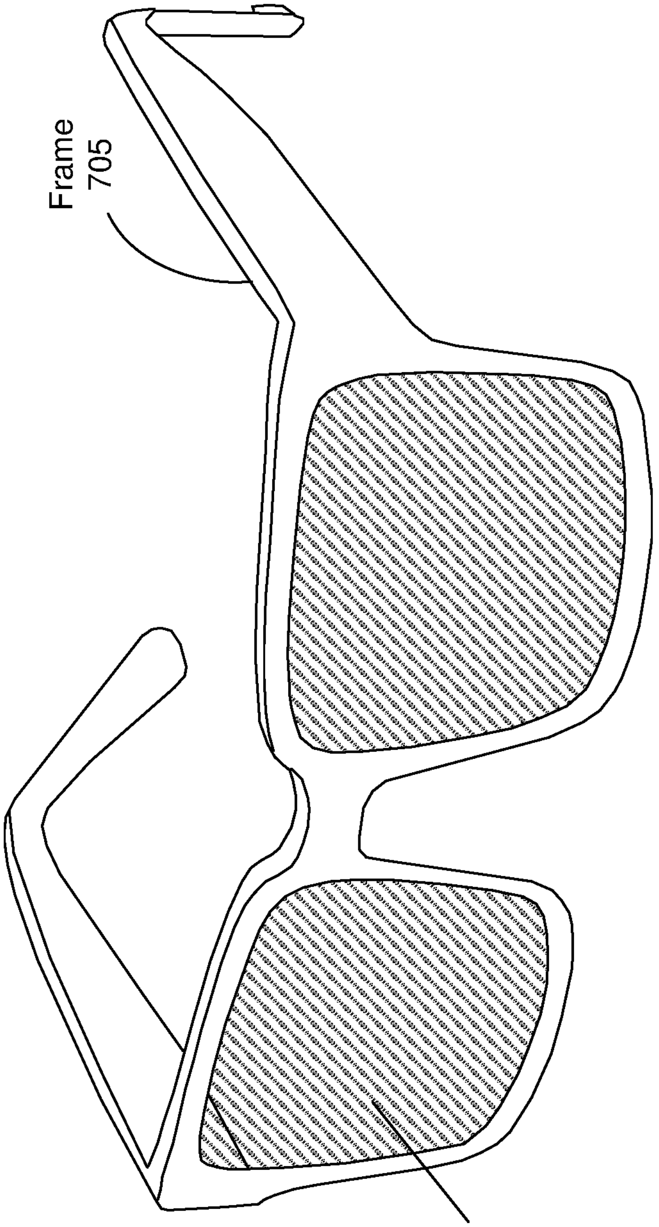
FIG. 7 is a schematic diagram of a near-eye display (NED), in accordance with an embodiment.

FIG. 7 is a schematic diagram of a near-eye-display (NED) 700, in accordance with an embodiment. The NED 700 presents media to a user, and is an example of the HMD 110. Examples of media presented by the NED 700 include one or more images, video, audio, or some combination thereof. In some embodiments, audio is presented via an external device (e.g., speakers and/or headphones) that receives audio information from the NED 700, a console (not shown), or both, and presents audio data based on the audio information. The NED 700 is generally configured to operate as a VR NED. However, in some embodiments, the NED 700 may be modified to also operate as an augmented reality (AR) NED, a mixed reality (MR) NED, or some combination thereof. For example, in some embodiments, the NED 700 may augment views of a physical, real-world environment with computer-generated elements (e.g., images, video, sound, etc.).

The NED 700 shown in FIG. 7 includes a frame 705 and a display 710. The frame 705 is coupled to one or more optical elements which together display media to users. In some embodiments, the frame 705 may represent a frame of eye-wear glasses. Although not shown in FIG. 7, the DCA 130 and PCA 195 may be mounted on or in the frame 705 or other portion of the NED 700. The display 710 is configured for users to see the content presented by the NED 700. The display 710 is an example of an electronic display 115. As discussed below in conjunction with FIG. 8, the display 710 includes at least one waveguide display assembly (not shown) for directing one or more image light to an eye of the user. The waveguide display assembly includes, e.g., a waveguide display, a stacked waveguide display, a varifocal waveguide display, or some combination thereof. The stacked waveguide display is a polychromatic display created by stacking waveguide displays whose respective monochromatic sources are of different colors.

Figure 8:
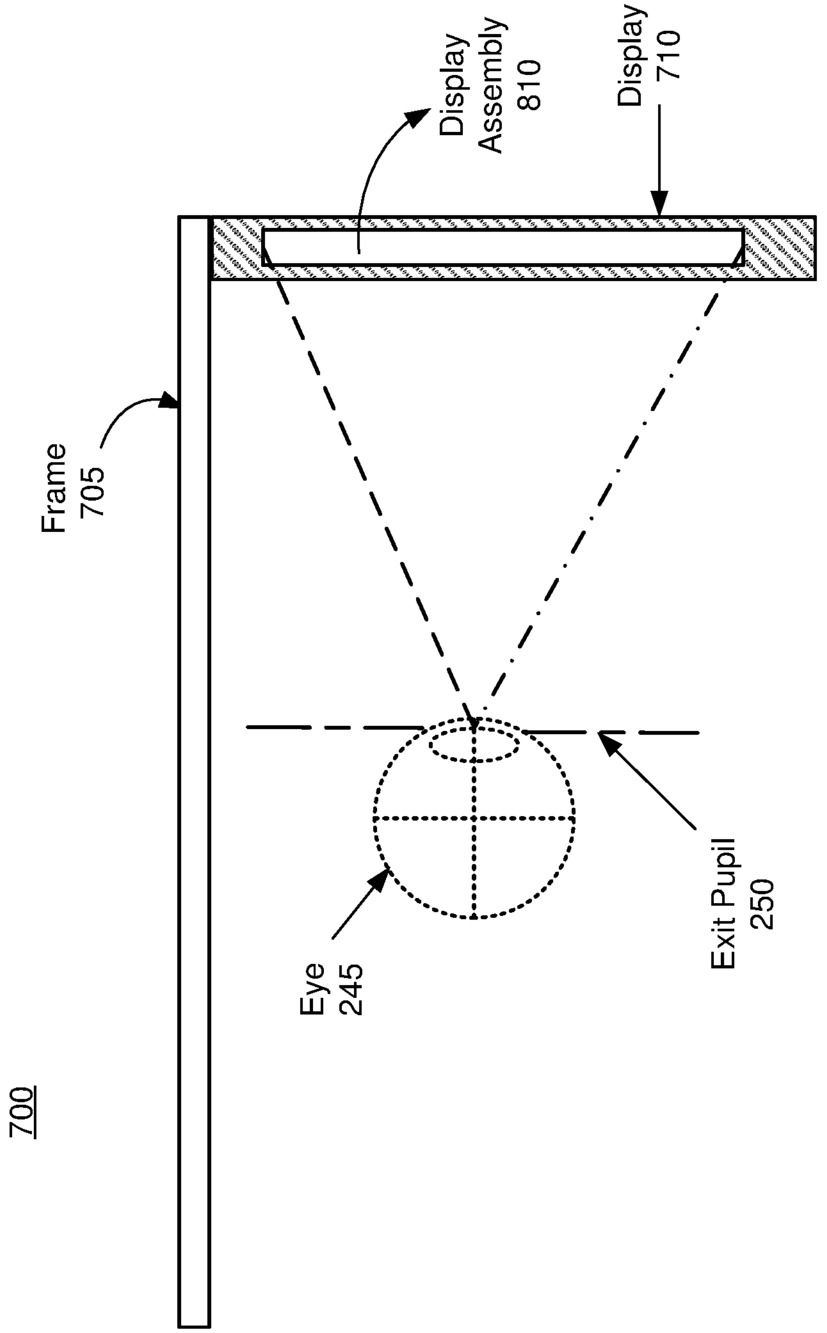
FIG. 8 is a cross-section of the NED illustrated in FIG. 7, in accordance with an embodiment.

FIG. 8 is a cross-section of the NED 700 illustrated in FIG. 7, in accordance with an embodiment. The display 710 includes at least one display assembly 810. An exit pupil 250 is a location where an eye 245 is positioned when the user wears the NED 700. For purposes of illustration, FIG. 8 shows the cross section associated with a single eye 245 and a single display assembly 810, but in alternative embodiments not shown, another waveguide display assembly which is separate from the waveguide display assembly 810 shown in FIG. 8, provides image light to another eye 245 of the user.

The display assembly 810, as illustrated below in FIG. 8, is configured to direct the image light to the eye 245 through the exit pupil 250. The display assembly 810 may be composed of one or more materials (e.g., plastic, glass, etc.) with one or more refractive indices that effectively minimize the weight and widen a field of view (hereinafter abbreviated as 'FOV') of the NED 700. In alternate configurations, the NED 700 includes one or more optical elements between the display assembly 810 and the eye 245. The optical elements may act to, e.g., correct aberrations in image light emitted from the display assembly 810, magnify image light emitted from the display assembly 810, some other optical adjustment of image light emitted from the display assembly 810, or some combination thereof. The example for optical elements may include an aperture, a Fresnel lens, a convex lens, a concave lens, a filter, or any other suitable optical element that affects image light.

In some embodiments, the display assembly 810 includes a stack of one or more waveguide displays including, but not restricted to, a stacked waveguide display, a varifocal waveguide display, etc. The stacked waveguide display is a polychromatic display (e.g., a red-green-blue (RGB) display) created by stacking waveguide displays whose respective monochromatic sources are of different colors.

Figure 9:
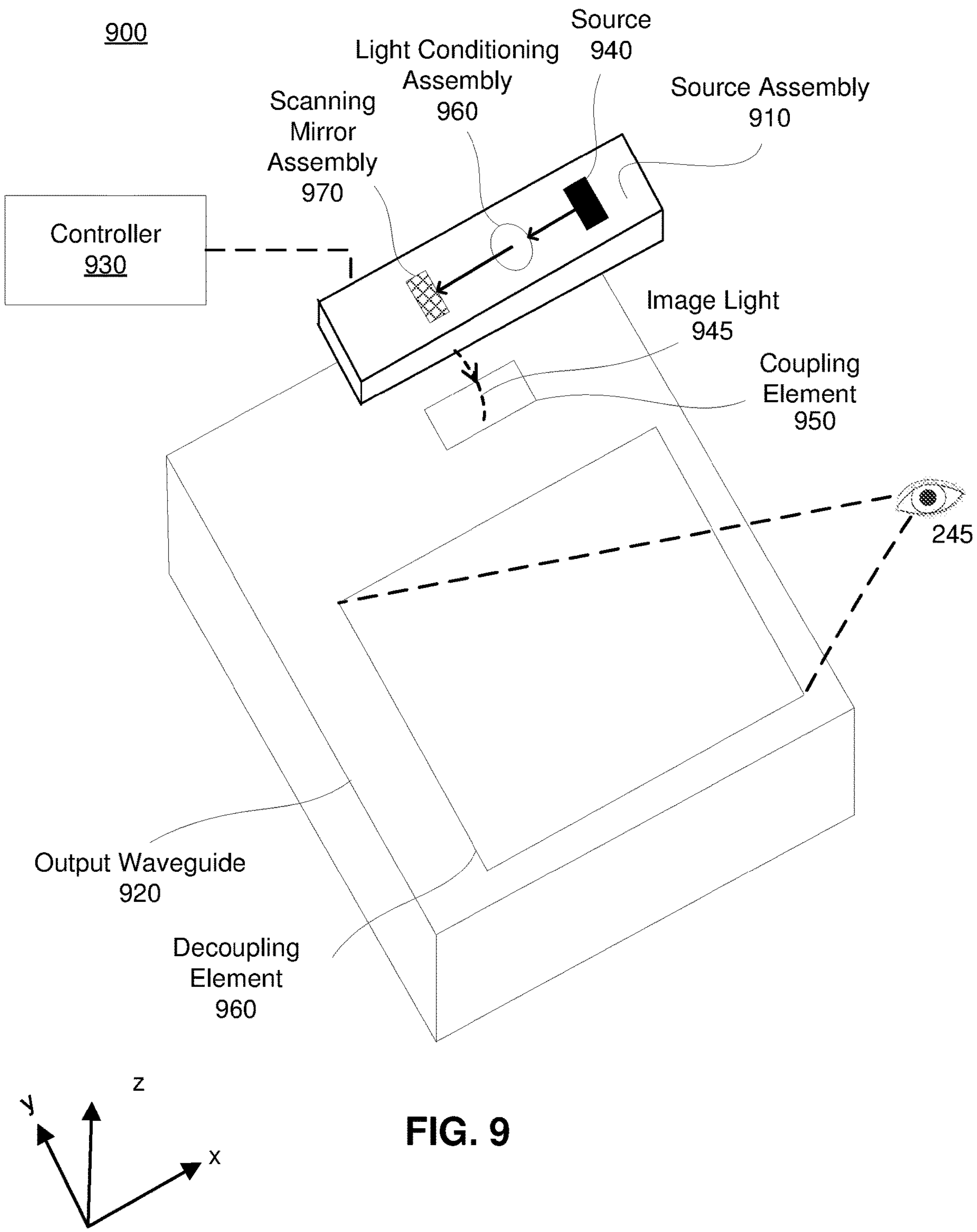
FIG. 9 is an isometric view of a waveguide display, in accordance with an embodiment

FIG. 9 illustrates an isometric view of a waveguide display 900, in accordance with an embodiment. In some embodiments, the waveguide display 900 (may also be referred to as a scanning waveguide display) is a component (e.g., display assembly 810) of the NED 700. In alternate embodiments, the waveguide display 900 is part of some other NED, or other system that directs display image light to a particular location.

The waveguide display 900 includes a source assembly 910, an output waveguide 920, and a controller 930. For purposes of illustration, FIG. 9 shows the waveguide display 900 associated with a single eye 245, but in some embodiments, another waveguide display separate (or partially separate) from the waveguide display 900, provides image light to another eye of the user. In a partially separate system, one or more components may be shared between waveguide displays for each eye.

The source assembly 910 generates image light. The source assembly 910 includes a source 940, a light conditioning assembly 960, and a scanning mirror assembly 970, described in detail below with reference to FIG. 10. The source assembly 910 generates and outputs image light 945 to a coupling element 950 of the output waveguide 920.

The source 940 is a source of light that generates at least a coherent or partially coherent image light. The source 940 emits light in accordance with one or more illumination parameters received from the controller 930. The source 940 includes one or more source elements, including, but not restricted to MicroLEDs.

The output waveguide 920 is an optical waveguide that outputs image light to an eye 245 of a user. The output waveguide 920 receives the image light 940 at one or more coupling elements 950, and guides the received input image light to one or more decoupling elements 960. In some embodiments, the coupling element 950 couples the image light 940 from the source assembly 910 into the output waveguide 920. The coupling element 950 may be, e.g., a diffraction grating, a holographic grating, some other element that couples the image light 940 into the output waveguide 920, or some combination thereof. For example, in embodiments where the coupling element 950 is diffraction grating, the pitch of the diffraction grating is chosen such that total internal reflection occurs, and the image light 940 propagates internally toward the decoupling element 960. For example, the pitch of the diffraction grating may be in the range of 300 nm to 600 nm.

The decoupling element 960 decouples the total internally reflected image light from the output waveguide 920. The decoupling element 960 may be, e.g., a diffraction grating, a holographic grating, some other element that decouples image light out of the output waveguide 920, or some combination thereof. For example, in embodiments where the decoupling element 960 is a diffraction grating, the pitch of the diffraction grating is chosen to cause incident image light to exit the output waveguide 920. An orientation and position of the image light exiting from the output waveguide 920 is controlled by changing an orientation and position of the image light 940 entering the coupling element 950. For example, the pitch of the diffraction grating may be in the range of 300 nm to 600 nm.

The output waveguide 920 may be composed of one or more materials that facilitate total internal reflection of the image light 940. The output waveguide 920 may be composed of e.g., silicon, plastic, glass, or polymers, or some combination thereof. The output waveguide 920 has a relatively small form factor for a head-mounted display. For example, the output waveguide 920 may be approximately 50 mm wide along X-dimension, 30 mm long along Y-dimension and 0.5-1 mm thick along Z-dimension. In some embodiments, the output waveguide 320 is a 2D optical waveguide.

The controller 930 controls the scanning operations of the source assembly 910. The controller 930 determines scanning instructions for the source assembly 910 based at least on the one or more display instructions. Display instructions are instructions to render one or more images. In some embodiments, display instructions may simply be an image file (e.g., bitmap). The display instructions may be received from, e.g., a console of a VR system (not shown here). Scanning instructions are instructions used by the source assembly 910 to generate image light 940. The scanning instructions may include, e.g., a type of a source of image light (e.g. monochromatic, polychromatic), a scanning rate, an orientation of a scanning mirror assembly, one or more illumination parameters, or some combination thereof. The controller 930 includes a combination of hardware, software, and/or firmware not shown here so as not to obscure other aspects of the disclosure.

Figure 10:
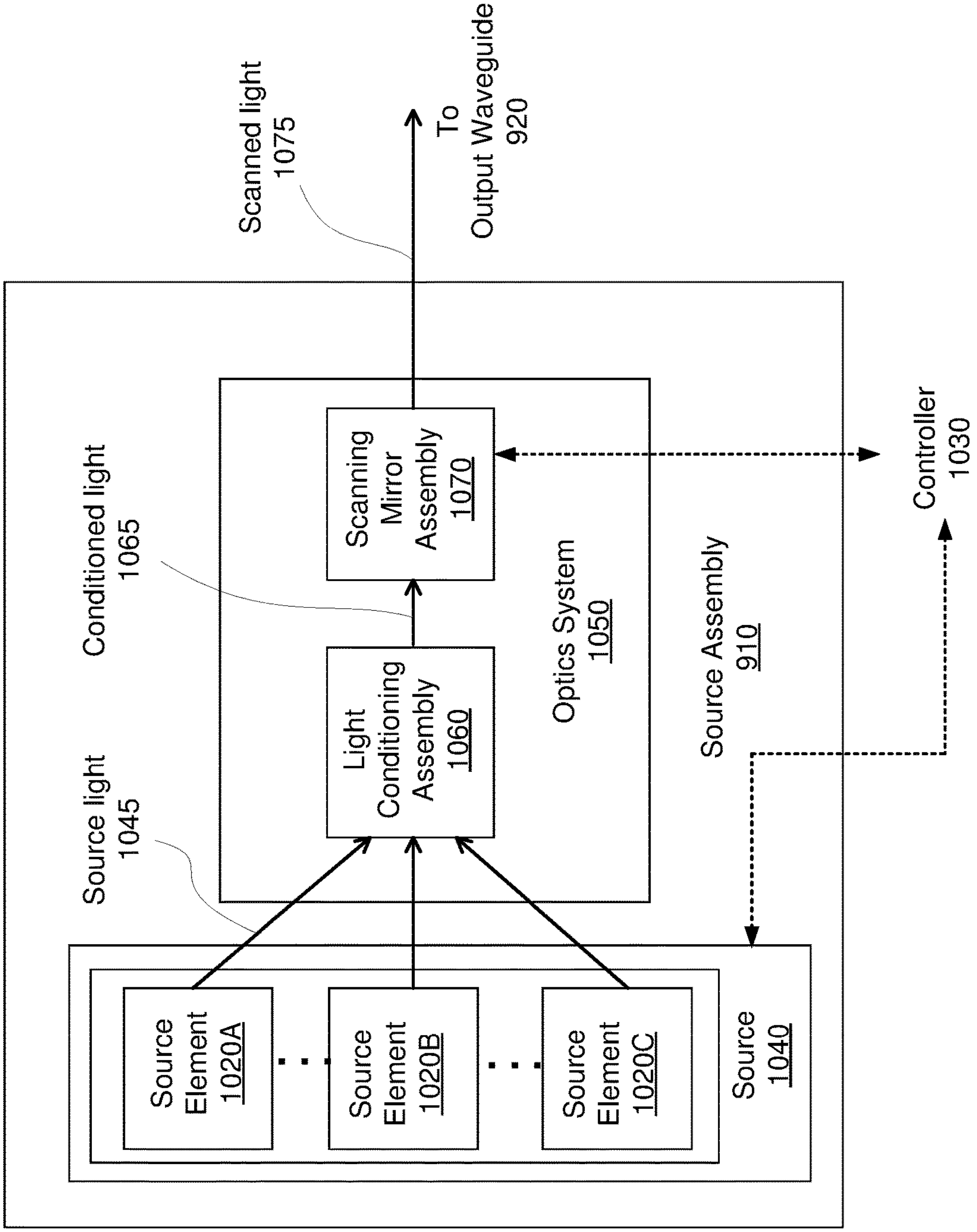
FIG. 10 is a block diagram of a source assembly with a 1D source, the source assembly outputting a scanned light, in accordance with an embodiment.

FIG. 10 is a block diagram of the source assembly 910 of FIG. 9 with a 1D source, the source assembly 910 outputting a scanned light, in accordance with an embodiment. The source assembly 910 includes a source 1040, and an optics system 1050. The source 1040 is an embodiment of the source 940 of FIG. 9. The optics system 1050 includes a light conditioning assembly 1060 and a scanning mirror assembly 1070. The light conditioning assembly 1060 is an embodiment of the light conditioning assembly 960 of FIG. 9. The scanning mirror assembly 1070 is an embodiment of the scanning mirror assembly 970 of FIG. 9. The source assembly 910 generates light in accordance with scanning instructions from the controller 930 of FIG. 9.

The source 1040 is a source of light that generates at least a coherent or partially coherent image light. The source 1040 emits light in accordance with one or more illumination parameters received from the controller 930. The source 1040 includes one or more source elements 1020. The source element 1020 may be LEDs with at least ultra-high brightness, low power consumption, and a low footprint. The source element 1020 may be, e.g., MicroLEDs, organic LEDs (OLEDs), a superluminescent LED (SLED), and organic MicroLEDs. A MicroLED is a LED that can be made small such that light emission area can be made to the order of a micron to a few tens of microns. For example, GaN-based inorganic LEDs can be made orders of magnitude brighter than OLEDs with a light emission area of few microns. The source 1040 may be a 1D source, 2D source, or have some other dimension.

In one embodiment, the source element 1020 may be arranged in a concave curved and linear fashion. For example, the source 1040 may have a radius of curvature ranging from few millimeters to few centimeters depending on the display size and a length of few millimeters. An advantage of a curved array is that it is much easier for a compact lens to have high quality image on curved surface without correcting the field of curvature of the lens. In alternate embodiments, the source element 1020 may be arranged in a flat and linear fashion.

The source element 1020 emits a source light 1045 to the optics system 1050. In some embodiments, the source light 1045 may emit one or more colors (e.g. red, green, and blue). For example, the source element 1020A emits a red source light, the source element 1020B emits a blue source light, and the source element 1020C emits a green source light. Additionally, in some embodiments, one or more of the source elements may emit light in the infrared.

The optics system 1050 includes a light conditioning assembly 1060 and a scanning mirror assembly 1070. The light conditioning assembly 1060 conditions the source light 1045 and emits conditioned light to the scanning mirror assembly 1070. Conditioned light is light conditioned for incidence on the scanning mirror assembly 1070. The light conditioning assembly 1060 includes one or more optical components that condition the light from the source 1040. Conditioning light from the source 1040 may include, e.g., expanding, collimating, correcting for one or more optical errors (e.g., field curvature, chromatic aberration, etc.), some other adjustment of the light, or some combination thereof. The light conditioning assembly 1060 conditions the source light 1045 and emits conditioned light 1065 to the scanning mirror assembly 1070.

The scanning mirror assembly 1070 includes one or more optical elements that redirect image light via one or more reflective portions of the scanning mirror assembly 1070. Where the image light is redirected toward is based on specific orientations of the one or more reflective portions. In some embodiments, the scanning mirror assembly includes a single scanning mirror that is configured to scan in at least two dimensions. In other embodiments, the scanning mirror assembly 1070 may include a plurality of scanning mirrors that each scan in orthogonal directions to each other. The scanning mirror assembly 1070 may raster scan (horizontally, or vertically). In some embodiments, the scanning mirror assembly 1070 may perform a controlled vibration along the horizontal and/or vertical directions with a specific frequency of oscillation to scan along two dimensions and generate a two-dimensional projected line image of the media presented to user's eyes. For example, the scanning mirror assembly 1070 may undergo an oscillation with peak-to-peak amplitude of few hundreds of nanometers per second along the vertical direction based on the desired frequency of oscillation. The scanning mirror assembly 1070 emits a scanned light 1075 based on the conditioned light 1065. The scanning mirror assembly 1070 outputs the scanned light 1075 at a particular orientation (in accordance with the scanning instructions) toward the output waveguide 920.

In some embodiments, the scanning mirror assembly 1070 includes a galvanometer mirror. For example, the galvanometer mirror may represent any electromechanical instrument that indicates that it has sensed an electric current by deflecting a beam of image light with one or more mirrors. The galvanometer mirror may be configured to scan in at least one orthogonal dimension to generate the scanned light 1075. The scanned light 1075 from the galvanometer mirror represents a two-dimensional line image of the media presented to user's eyes.

The controller 930 controls the source 1040 and the scanning mirror assembly 1070. The controller 930 takes content for display, and divides the content into discrete sections. The controller 930 instructs the source 1040 to sequentially present the discrete sections. The controller 930 instructs the scanning mirror assembly 1070 to scan the presented discrete sections to different areas of a coupling element of the output waveguide. Accordingly, at the exit pupil of the output waveguide 920 each discrete portion is presented in a different location. While each discrete section is presented at different times, the presentation and scanning of the discrete sections occurs fast enough such that a user's eye integrates the different sections into a single image or series of images.

For example, in embodiments where the source 1040 includes a linear one-dimensional array of source elements 1020, the content is divided by the controller 930 into lines where the lines are scanned out to different areas of the coupling element of the output waveguide 920, such that, at the exit pupil of the output waveguide 920 each of the lines are presented at a different location which a user's eye integrates into a single image or series of images.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A head mounted display (HMD) comprising:

a depth camera assembly (DCA) configured to generate depth image data of an area;

a camera configured to generate color image data of the area; and processing circuitry configured to:

receive, from the DCA, a frame of the depth image data;

generate a depth map of a portion of the area based on the frame of the depth image data;

receive, from the camera, a frame of the color image data for the portion of the area;

determine a location in a model of the area that corresponds with the portion of the area of the depth map based on the frame of the color image data; and update the model of the area by combining the depth map of the portion of area with one or more other depth maps of one or more other portions of the area based on the location in the model.

2. The HMD of claim 1, further including a display, and wherein the processing circuitry is further configured to generate a rendering of the portion of the area based on the model of the area and provide the rendering to the display.

3. The HMD of claim 1, wherein the processing circuitry is further configured to apply a texture to the model based on color image data.

4. The HMD of claim 1, wherein the DCA includes a structured light (SL) projector configured to illuminate the portion of the area with a plurality of SL elements, and an imaging device configured to capture the frame of the depth image data including the SL elements reflected from the portion of the area.

5. The HMD of claim 4, wherein:

the SL projector includes a light emitter and a pattern plate including apertures corresponding with the plurality of SL elements, the light emitter configured to generate light and pass the light through the apertures of the pattern plate to illuminate the portion of the area with the plurality of SL elements; and the processing circuitry configured to generate the depth map includes the processing circuitry being configured to match at least a portion of the plurality of SL elements captured by the DCA with at least a portion of the apertures of the pattern plate.

6. The HMD of claim 5, wherein the processing circuitry configured to match at least a portion of the plurality of SL elements with at least a portion of the apertures of the pattern plate includes the processing circuitry being configured to:

generate a hash table for a pattern the pattern plate;

identify an SL element in the frame of the depth image data;

apply warp functions to a window around the SL element in the frame of the depth image data to generate candidate warps, each of the warp functions applying at least one of a stretch or a skew to the window;

determine binary codes for the candidate warps; and match the SL element to an aperture of the pattern based on comparing the binary codes of the candidate warps with the hash table of the pattern.

7. The HMD of claim 6, wherein the pattern includes multiple apertures and the window includes multiple SL elements.

8. The HMD of claim 5, wherein the processing circuitry configured to match at least a portion of the plurality of SL elements with at least a portion of the apertures of the pattern plate includes the processing circuitry being configured to:

match a first SL element with a first aperture;

match a second SL element with a second aperture;

determine a distance between the first SL element and the second SL element in the frame;

determine a distance threshold for detecting a false positive match; and discard at least one of the match between the first SL element with the first aperture and the match between the second SL element with the second aperture when the distance is larger than the distance threshold.

9. The HMD of claim 5, wherein the processing circuitry configured to match at least a portion of the plurality of SL elements with at least a portion of the apertures of the pattern plate includes the processing circuitry being configured to:

match a first SL element with a first aperture; and match a second SL element with a second aperture based on the match between the first SL element with the first aperture and relative positions of the first aperture and the second aperture of the pattern plate.

10. The HMD of claim 5, wherein the processing circuitry configured to generate the depth map includes the processing circuitry being configured to determine a normal vector for the at least a portion of the plurality of SL elements based on a triangulation using a distance between the SL projector and the imaging device.

11. The HMD of claim 10, wherein the processing circuitry configured to generate the depth map includes the processing circuitry being configured to:

determine a topology based on normal vectors of the plurality of SL elements; and determine a normal vector for a location in the frame of the depth image data that is unilluminated by the plurality of SL elements based on the topology.

12. A method comprising:

receiving, by a processing circuitry and from a depth camera assembly (DCA) of a head-mounted display (HMD), a frame of depth image data captured by the DCA;

generating, by the processing circuitry, a depth map of a portion of an area based on the frame of the depth image data;

receiving, by the processing circuitry and from a camera of the HMD, a frame of color image data for the portion of the area;

determining, by the processing circuitry, a location in a model of the area that corresponds with the portion of area of the depth map based on the frame of the color image data; and updating, by the processing circuitry, the model of the area by combining the depth map of the portion of area with one or more other depth maps of one or more other portions of the area based on the location in the model.

13. The method of claim 12, further comprising, by the processing circuitry:

generating a rendering of the portion of the area based on the model of the area; and displaying the rendering on a display of the HMD; and applying a texture to the depth map based on the color image data.

14. The method of claim 12, further comprising:

illuminating the portion of the area with a plurality of SL elements of the DCA; and capturing the frame of the depth image data including the SL elements reflected from the portion of the area by an imaging device of the DCA.

15. The method of claim 14, further comprising:

generating, by a light emitter of the SL projector, light and passing the light through apertures of a pattern plate of the SL projector to illuminate the portion of the area with the plurality of SL elements; and wherein:

generating the depth map includes matching at least a portion of the plurality of SL elements captured by the DCA with at least a portion of the apertures of the pattern plate.

16. The method of claim 15, wherein matching at least a portion of the plurality of SL elements with at least a portion of the apertures of the pattern plate includes:

generating a hash table for a pattern of the pattern plate;

identifying an SL element in the frame of the depth image data;

applying warp functions to a window around the SL element in the frame of the depth image data to generate candidate warps, each of the warp functions applying at least one of a stretch or a skew to the second window;

determining binary codes for the candidate warps; and matching the SL element to an aperture of the pattern based on comparing the binary codes of the candidate warps with the hash table of the pattern.

17. The method of claim 15, wherein matching at least a portion of the plurality of SL elements with at least a portion of the apertures of the pattern plate includes:

matching a first SL element with a first aperture;

matching a second SL element with a second aperture;

determining a distance between the first SL element and the second SL element in the frame;

determining a distance threshold for detecting a false positive match; and discarding at least one of the match between the first SL element with the first aperture and the match between the second SL element with the second aperture when the distance is larger than the distance threshold.

18. The method of claim 15, wherein matching at least a portion of the plurality of SL elements with at least a portion of the apertures of the pattern plate includes:

matching a first SL element with a first aperture; and matching a second SL element with a second aperture based on the match between the first SL element with the first aperture and a distance between the first aperture and the second aperture of the pattern plate.

19. The method of claim 15, wherein generating the depth map includes determining a normal vector for the at least a portion of the plurality of SL elements based on a triangulation using a distance between the SL projector and the imaging device.

20. The method of claim 19, wherein generating the depth map includes:

determining a topology based on normal vectors of the at least a portion of the plurality of SL elements; and determining a normal vector for a location in the frame of the depth image data that is unilluminated by the plurality of SL elements based on the topology.

* * * * *